United States Patent
Krumme

(10) Patent No.: US 8,731,348 B2
(45) Date of Patent: May 20, 2014

(54) CAPACITIVE ROTARY JOINT FOR OPTICAL SIGNALS

(75) Inventor: Nils Krumme, Feldafing (DE)

(73) Assignee: Schleifring und Apparatebau GmbH (DE)

( * ) Notice: Subject to any disclaimer, the term of this patent is extended or adjusted under 35 U.S.C. 154(b) by 63 days.

(21) Appl. No.: 13/028,636

(22) Filed: Feb. 16, 2011

(65) Prior Publication Data
US 2011/0206319 A1 Aug. 25, 2011

(30) Foreign Application Priority Data
Feb. 23, 2010 (DE) .......................... 10 2010 000 525

(51) Int. Cl.
| | |
|---|---|
| *G02B 6/26* | (2006.01) |
| *G02B 6/42* | (2006.01) |
| *G02B 6/36* | (2006.01) |
| *A61B 5/00* | (2006.01) |

(52) U.S. Cl.
USPC .................................. 385/26; 378/4; 378/21

(58) Field of Classification Search
CPC ... G02B 6/3604; A61B 5/0066; A61B 5/6852
USPC .......................................................... 385/26
See application file for complete search history.

(56) References Cited

U.S. PATENT DOCUMENTS

| | | | |
|---|---|---|---|
| 5,579,357 A | 11/1996 | Harrison | |
| 6,104,849 A * | 8/2000 | Lewis et al. | 385/26 |
| 6,898,346 B2 * | 5/2005 | Mercey et al. | 385/26 |
| 2004/0141686 A1 * | 7/2004 | Schilling et al. | 385/26 |
| 2005/0069249 A1 * | 3/2005 | Lo et al. | 385/26 |

* cited by examiner

*Primary Examiner* — Ryan Lepisto
*Assistant Examiner* — Erin Chiem
(74) *Attorney, Agent, or Firm* — Yakov Sidorin; Quarles & Brady LLP

(57) ABSTRACT

A non-contacting rotary joint for transmitting an input signal guided within an input optical waveguide has an electrical transmission line and a probe. The transmission line has an even number N≥4 of equal length transmission line segments. The optical waveguide is connected to an optical distribution network which has an optical power splitter for splitting the input signal into N or N/2 individual signals of equal optical power. These signals are forwarded to opto-electrical converters to generate electrical signals for driving the electrical transmission line. The lengths of the optical transmission lines are adjusted so that the propagation time of the optical signal from the end of the input optical waveguide to the end of each individual optical transmission line is approximately the same.

13 Claims, 5 Drawing Sheets

CAPACITIVE ROTARY JOINT FOR OPTICAL SIGNALS

PRIORITY CLAIM

This application claims priority to pending German Application No. DE 10 2010 000 525.8 filed on Feb. 23, 2010, which is fully incorporated herein by reference.

BACKGROUND OF THE INVENTION

1. Field of the Invention

The invention relates to a data transmission system for transmitting data between a rotating part and a stationary part, in particular between the rotating part and the stationary part of a computer tomograph, and also to a computer tomograph having a corresponding transmission system.

2. Description of the Relevant Art

Rotatable units such as radar devices or computer tomographs often require transmitting electrical signals or energy in either direction between a rotating and a stationary part. For this, usually a conductor structure for conducting electrical signals to be transmitted is provided in a primary unit, and a suitable tap or probe in a secondary unit. These transmission systems are known as rotary joints and are categorized into contacting and non-contacting rotary joints. The contacting rotary joints mostly have a comparatively solid conductor in the primary unit and a brush like a wire or a carbon brush in the secondary unit. The brush is in electrical and mechanical contact with the conductor. The contacting rotary joints are also known as sliprings. Non-contacting rotary joints generally have a conductor designed as a transmission line which may be a printed circuit board in the primary unit and which is generally designed to generate low far-field radiation while conducting the signal to be transmitted. In the secondary unit there is a comparatively small probe which capacitively picks up near field signals from the conductor of the primary unit.

Non-contacting rotary joints are often used in computer tomography (CT) scanners. The transmission line being part of the rotating part of the gantry is often attached to an outer surface of said rotating part. In most cases it has a diameter of approximately 1.5 meters. This results in an overall length of the transmission line of about 4.5 meters. Up to date, CT scanners have to transmit data at a rate of more than 5 GB per second, up to 30 GB per second. In the future, even higher data rates are expected. It is obvious that the transmission line has to carry signals at high frequency in the Gigahertz frequency range. The transmission line itself is designed similar to a strip line and may have a specific pattern for filtering signals. It must be highly symmetric to avoid far field radiation which leads to enhanced electromagnetic radiation of the scanner, which is not desired. Furthermore, the transmission line must have low losses to lead the high frequency signals without significant attenuation to maintain a good signal/noise ratio over the full length of the transmission line and therefore independently of the rotational position of the CT scanner gantry.

U.S. Pat. No. 5,579,357 discloses a transmission line which is split into two equal parts. Each part receives the signals to be transmitted by a phase splitter at one end and is terminated at the other end. Here, still each section of the transmission line has a length of more than 2 meters which is still difficult to manufacture.

Such transmission lines may be manufactured by using enhanced glass fiber reinforced epoxy printed circuit boards. Modern printed circuit board technologies using substrates based on PTFE (polytetrafluorethylene) or ceramic materials are only available for small RF printed circuit boards and cannot be used here.

SUMMARY OF THE INVENTION

The problem to be solved by the invention is to make a rotary joint with a diameter suitable for CT scanners, which has a primary side with a transmission line which can be manufactured by using radio frequency printed circuit board manufacturing materials and methods. A further problem to be solved is to enhance the data rate of the rotary joint. Furthermore manufacturing of the rotary joint shall be simplified and costs shall be reduced.

A further problem to be solved is to allow the use of standard printed circuit board technologies instead of RF printed circuit boards while maintaining low electromagnetic interference and good signal transmission quality.

Another aspect of the invention relates to a CT scanner with a rotary joint.

Solutions of the problems are described in the independent claims. The dependent claims relate to further improvements of the invention.

According to the invention, a rotary joint for transmitting electrical signals or energy from a primary part to a secondary part, both parts being rotatable against each other, receives a signal to be transmitted by an optical line. This optical line may be a single-mode fiber or a multi-mode fiber, for example a plastic optical fiber. Due to the high transmission rates, a single-mode fiber is preferred. Attached to this fiber is a splitter dividing the optical signal into N or N/2 equal signals, where N is an even number and N≥4. Preferably N is 4, 6 or 8. For the case, N is selected as N=8, the transmission line is divided into N=8 equal sections and the optical splitter divides the optical input signal into 4 or 8 equal signals. The individual optical signals from the splitter are converted into electrical signals by opto-electrical converters. For the case the splitter divides the optical signal into N signals, one opto-electrical converter is provided for each segment. If the splitter divides the optical signal into N/2 signals, then one opto-electrical converter is provided for each pair of segments. To adapt the signals from the opto-electrical converter to the characteristics of the transmission line segments, an additional driver or amplifier may be provided. All segments have the same length. Each segment has two conductors which are fed by a differential signal. Any two segments neighbored to each other are fed by electrical signals such that they conduct the signals propagating into opposite directions. The segments have a feeding point at one end which is connected to an electrical differential signal source, and a termination which may consist of terminating resistors at the other end.

The optical power splitter may be one splitter or it may be divided into a plurality of cascaded splitters.

To avoid signal distortion when a probe passes from one section to another section, the signals at the joint between neighbored sections of the transmission line must have a maximum allowable time difference which may be less than 10% of a bit period of the digital signal to be transmitted. It may also be acceptable if the time difference is less than 20%, 30%, 40% or even 50% of a bit period. Anyway it is preferred to have the time difference below 10% of a bit period, preferably below 5%, 2% or 1%. To achieve this, the optical length of the optical path between a given position of the single light wave guide from the optical transmitter and each of the optical receivers must be approximately the same. It must be selected or manufactured such that the maximum length difference between the paths to individual optical receivers results in propagation time differences less than the maximum allowed time difference between neighbored transmission segments. The lengths are preferably determined by measuring the path length from the first input of the optical splitter to the input of each opto-electrical converter. Of course the path length within the optical splitters must be included.

BRIEF DESCRIPTION OF DRAWINGS

In the following the invention will be described by way of example, without limitation of the general inventive concept, on examples of embodiment with reference to the drawings.

Figure 1:
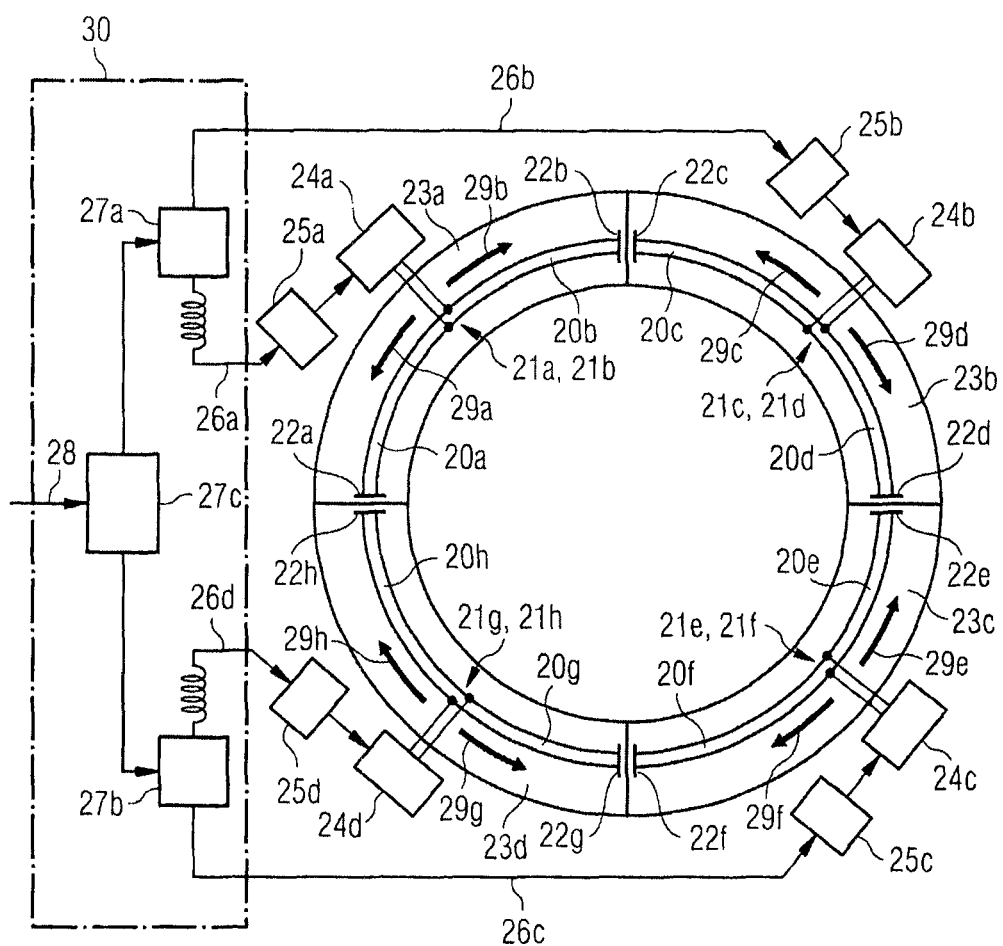
FIG. 1 shows the primary side of an inventive rotary joint in detail.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 7:
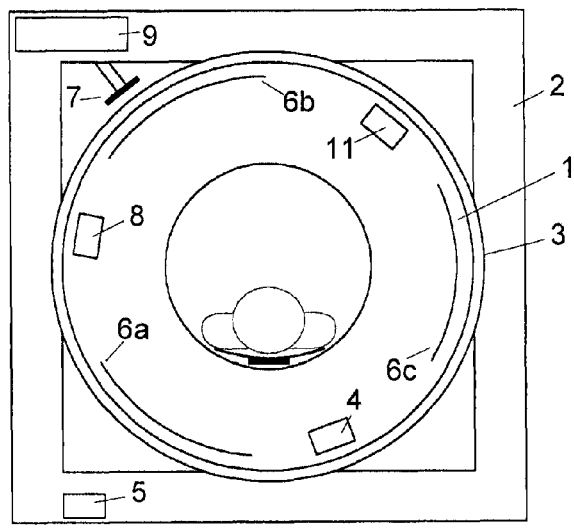
FIG. 7 schematically shows a data transmission system.

A rotary joint 3, such as shown in FIG. 7, in accordance with an embodiment of the invention has an electrical transmission line 6a-c which is disposed on or integrated into a primary part, which may be the rotating part 1 preferably along the circumference. The transmission line has at least one line, preferably two differentially driven lines for conducting electro-magnetic waves, which is mounted preferably along at least one circular segment or a circular track on the primary part.

Figure 2:
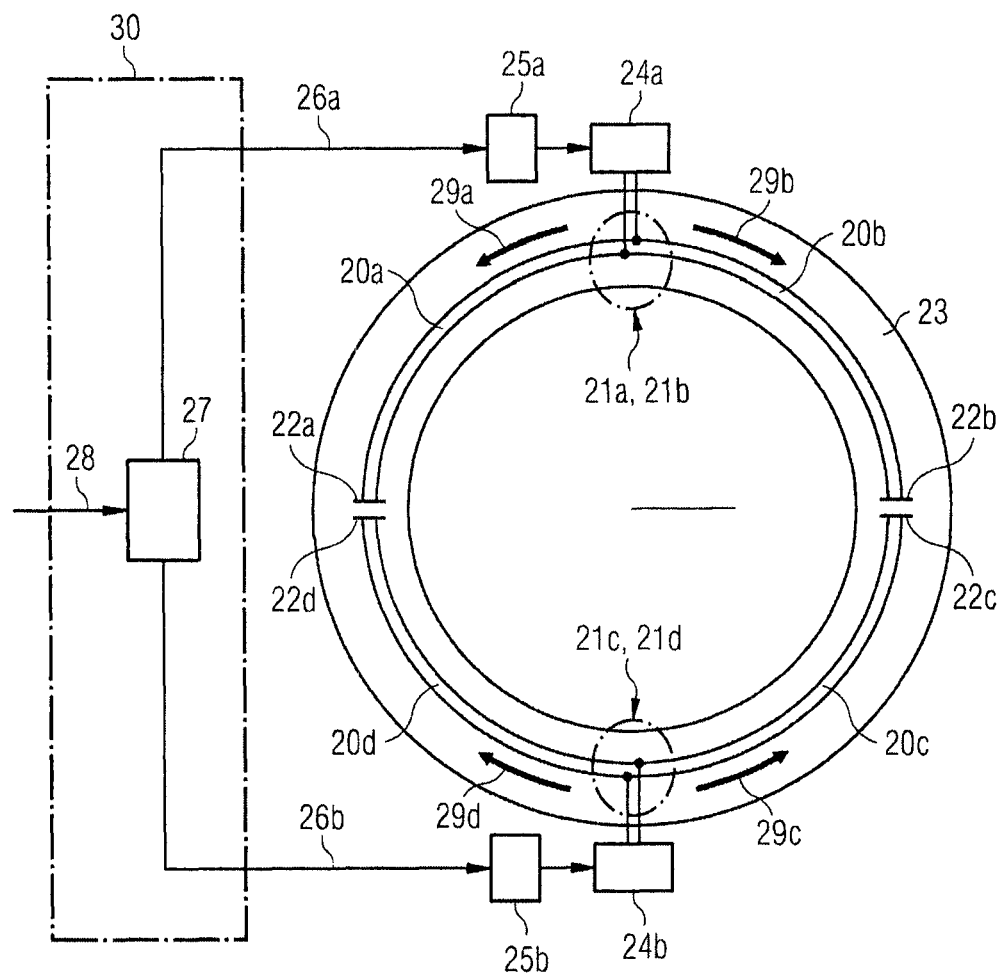
FIG. 2 shows a simplified embodiment.
Figure 3:
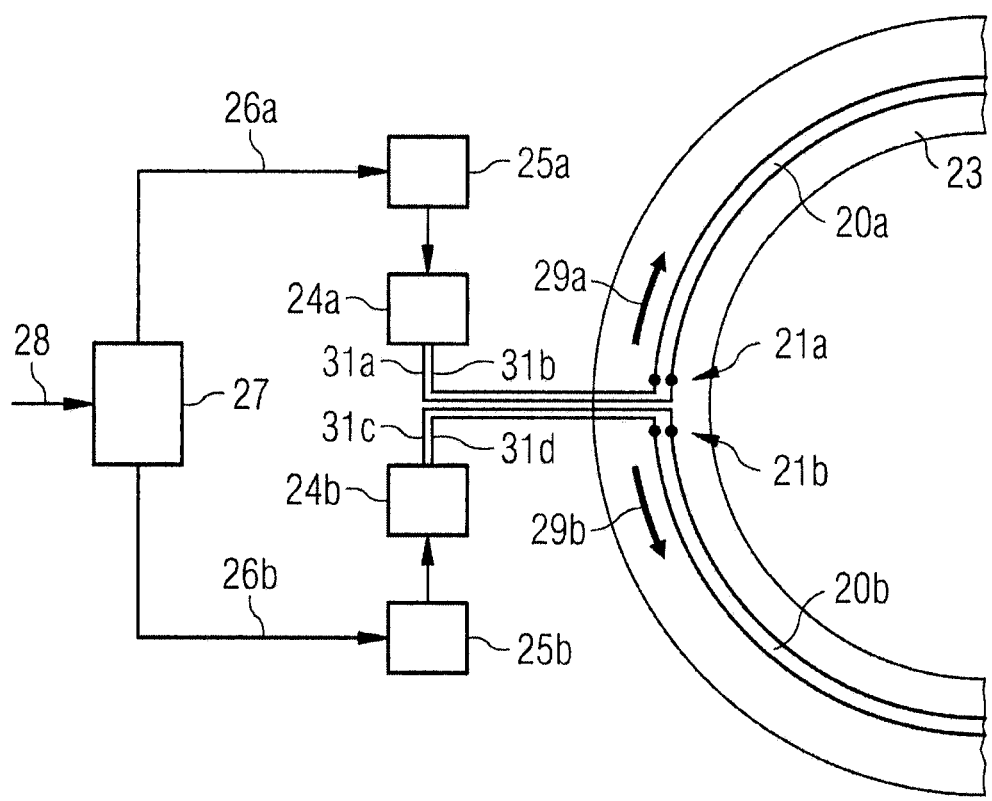
FIG. 3 shows a modified coupling scheme.

A probe (receiving coupler) 7 is disposed on or integrated into a secondary part to be opposite to the primary part, i.e. on the stationary part 2. It is designed to couple signals from the transmission line 6a-c. The signals from the probe may be converted to optical signals which may be guided within an optical waveguide, preferably a single mode fiber by means of an electro-optical converter. The signals from the probe 7 are conducted to a receiving unit 23, such as shown in FIGS. 2 and 3. This receiving unit amplifies the signals from the receiving coupler arrangement, and conditions the signals, if necessary.

The transmission line is divided into a number N of individual segments 20a, 20b, 20c, 20d. The ends of neighbored segments preferably are in close proximity with each other to avoid gaps in between causing signal loss. The transmission line segments are mounted on a dielectric base 23, which preferably is a RF printed circuit board, preferably comprising of ceramic or polytetrafluorethylene materials. There may be one common dielectric base for all segments, but it is preferred to have individual dielectric basis for each individual segment or for a pair of neighbored segments. At least one and preferably two neighbored segments are fed by a driver 24a, 24b, 24c, 24d. A driver is a circuit for adapting the signals at the input to be fed into the transmission line. Therefore, it adapts a signal in its amplitude and power level to the given impedance of the transmission line. It furthermore may do filtering to adapt to the frequency characteristic of the transmission line. Each driver receives electrical signals from an opto-electrical converter 25. In another embodiment, one opto-electrical converter supplies signals to two drivers, the drivers feeding neighbored segments of the transmission line.

The individual opto-electrical converters are fed by an optical distribution network 30 comprising light wave guides and optical power splitters. In most CT scanners, data from the data acquisition system attached to the X-ray detector is transmitted by optical signals, transferred via single-mode or multi-mode optical fibers. Such an optical fiber 28 is connected to at least one optical power splitter 27 splitting the optical signals into a plurality of equal output signals. These output signals may be further split into further sets of equal output signals. The optical distribution network 30 converts one single input signal from input line 28 into a plurality of equal signals in lines 26a, 26b, 26c, 26d. It is essential that the optical paths through the optical distribution network starting from the input to which line 28 is connected to the input of each individual opto-electrical converter 25a, 25b, 25c, 25d are equal.

FIG. 1 shows the primary side of an inventive rotary joint in detail. The individual transmission line segments 20a-20h, each comprising of two parallel differentially driven transmission lines are circularly arranged. Each transmission line segment has the same length and has a feeding point 21a-21h and a termination 22a-22h at the opposite end. The electrical signals are conducted in each line segment from the feeding point to the termination. The termination absorbs the signal conducted in the line segment and avoids a reflected signal to propagate backwards through the line segment. The transmission line segments are attached to dielectric base or carrier segments 23, 23b, 23c, 23d. Here, exemplarily two neighbored feeding points 21a, 21b; 21c, 21d; 21e, 21f; 21g, 21h are connected together to drivers 24a, 24b, 24c, 24d. Each driver is connected to an opto-electrical converter 25a, 25b, 25c, 25d. These opto-electrical converters are fed by optical transmission lines 26a, 26b, 26c, 26d from optical power splitters 27a, 27b, 27c. A first optical power splitter 27c receives an input from input optical transmission line 28 from the data source which may be a data acquisition system of a CT scanner. The signal is divided into two equal signals, from which a first one is fed into the second optical power splitter 27a, and the other one is fed into the third optical power splitter 27b. Said second and third optical power splitters split the input signals received from first optical power splitter 27c into equal output signals coupled over optical transmission lines 26a, 26b, 26c, 26d to the opto-electrical converters 25a, 25b, 25c, 25d. For ensuring the equal optical delay and therefore the equal optical length between the end of fiber 28 and the inputs of the opto-electrical converters the optical transmission lines 26a, 26b, 26c, 26d all have the same length. Therefore in this figure the optical transmission lines 26a and 26d are wound up like coils.

FIG. 2 shows a simplified embodiment where only 4 transmission line segments 20a, 20b, 20c, 20d are provided. Accordingly, there are only two opto-electrical converters and two drivers attached thereto. There is only one optical power splitter 27 dividing the input signal from input line 28 into two equal signals distributed over the optical transmission lines 26a and 26b.

FIG. 3 shows a modified coupling scheme of the transmission line segments to the drivers. First, the optical input signal from input line 28 is divided by optical power splitter 27 into two equal signals distributed through optical transmission lines 26a and 26b to corresponding opto-electrical converters 25a and 25b. These feed the drivers 24a and 24b with electrical input signals. Both drivers are connected via interface lines 31a-31d to the individual lines of each line segment. First driver 24a is connected to line segment 20a via interface lines 31a and 31b. Driver 24b is connected to transmission line segment 20b through interface lines 31c and 31d. Alternatively two drivers 24a and 24b fed by one common opto-electrical converter. In another alternative embodiment only one driver 24a may be connected to both line segments 20a and 20b.

Figure 4:
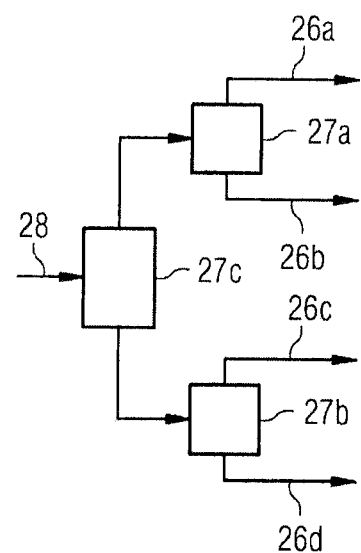
FIG. 4 shows the optical distribution network.

FIG. 4 shows the optical distribution network 30 as explained before. This optical distribution network has three cascaded optical 3 dB splitters 27a, 27b, 27c.

Figure 5:
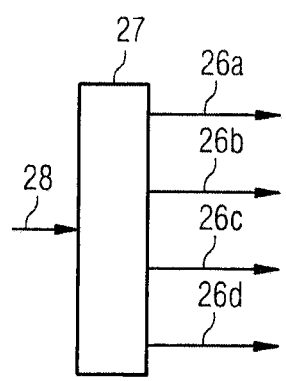
FIG. 5 shows a different embodiment of the optical distribution network.

FIG. 5 shows a different embodiment of the optical distribution network. This optical network uses a single four channel 6 dB power splitter, dividing signal from input line 28 into four signals at optical transmission lines 26a-26d.

Figure 6:
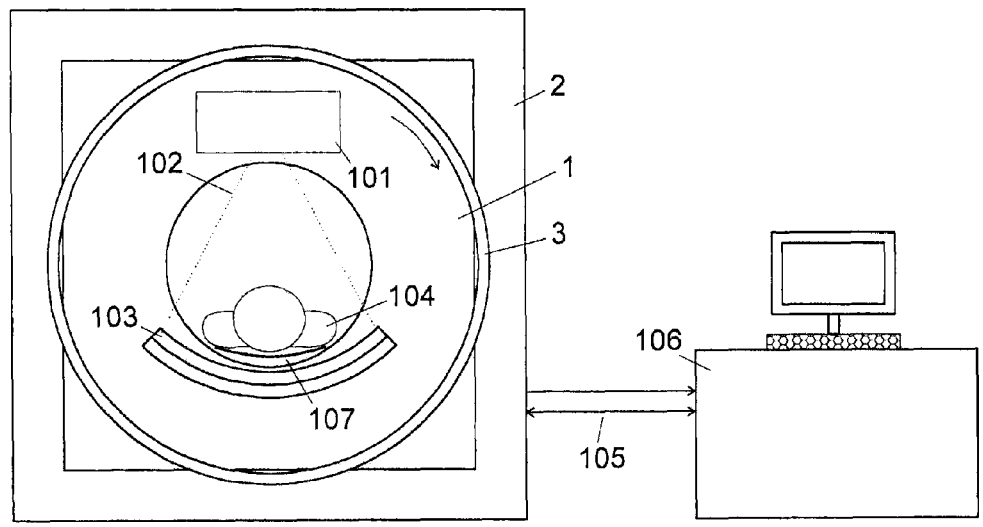
FIG. 6 schematically shows in a general form a computer tomograph.

FIG. 6 shows a rotary joint on an example of a computer tomograph. The computer tomograph (CT scanner) consists of two main mechanical parts. A stationary part 2 serves as a base and support of the entire instrument, in which the rotating part 1 rotates. A patient 104 is positioned on a berth 107 in the opening of the rotating part. An X-ray tube 101 and also a detector 103 disposed opposite thereto are provided for scanning the patient by means of X-rays 102. The X-ray tube 101 and the detector 103 are disposed to be rotatable on the rotating part 1. A rotary joint 3 serves for electrical connection between the rotating part 1 and the stationary part 2. With this, on the one hand the high electrical power for feeding the X-ray tube 101 is transmitted in the direction of the rotating part 1, and simultaneously the raw data of the image are transmitted in the opposite direction. Parallel to this, communication of control information in both directions is provided. An evaluation and control unit 105 serves for operating the computer tomograph and also for displaying generated images. Communication with the computer tomograph is effected via a bidirectional link 105.

FIG. 7 shows in simplified form an example of an arrangement of a data transmission system. The data from a data source 4 (detector 103 with subsequent signal processing or DAS) on the rotating part 1 are conditioned with a first transmission means 8 and relayed to the transmission line which here is illustrated by way of example as comprising three parts 6a, 6b, 6c, each having two segments. This transmission line arrangement now conducts the high-frequency signals. These are probed by the probe 7. A probe which is fixedly connected with the stationary frame is illustrated by way of example. The signals intercepted by this probe 7 are relayed to a first receiving means 9 for conditioning. Output signals from the latter are then conducted to a data sink 5.

It will be appreciated to those skilled in the art having the benefit of this disclosure that this invention is believed to provide optical rotary joints and computer tomography scanners. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A non-contacting rotary joint for transmitting an input signal guided within an input optical waveguide, said rotary joint comprising:
    an electrical transmission line and a probe;
        the electrical transmission line further having an even number $N \geq 4$ of equal length electrical transmission line segments;
        each electrical transmission line segment having a feeding point and a termination;
    wherein the optical waveguide is connected to an optical distribution network comprising at least one optical power splitter, splitting said input signal into individual signals of equal optical power and optical transmission lines for forwarding said individual signals to opto-electrical converters;
    each opto-electrical converter forwarding an electrical signal to drivers;
    each driver feeding one or two electrical transmission line segments; and
    the lengths of the optical transmission lines are adjusted so that the propagation. time of the optical signal from the end of the input optical waveguide to the end of each individual optical transmission line is approximately the same.

2. The non-contacting rotary joint according to claim 1, wherein the optical distribution network has one optical power splitter for splitting the input signal guided within an input optical waveguide into N or N/2 individual signals of equal optical power.

3. The non-contacting rotary joint according to claim 1, wherein the optical distribution network has at least 3 cascaded optical power splitters for splitting the input signal guided within an input optical waveguide into N or N/2 signals of equal optical power.

4. A CT scanner having a non-contacting rotary joint according to claim 1.

5. A non-contacting rotary joint for transmitting data between a rotor and a stator, said rotary joint comprising
    a first portion disposed at the rotor and a second portion disposed at the stator, the first and second portions being in wireless electrical communication with one another, wherein the first portion includes
    an optical waveguide;
    an optical distribution network in optical communication with the optical waveguide and comprising
        at least one optical power splitter configured to split light received from the optical waveguide into an even number $N \geq 4$ or N/2 of light portions having equal optical powers,
        opto-electrical converters, and
        optical transmission lines adapted to transmit said light portions between said at least one optical power splitter and said opto-electrical converters,
    an electrical transmission line having electrical transmission line segments with equal lengths, and
    electrical drivers, each of which electrically connects a respectively corresponding opto-electrical converter and one or two of said electrical transmission line segments such as to electrically drive said one or two of said electrical transmission line segments to transmit electrical field in response to a light portion received by said opto-electrical converter from the at least one optical power splitter;
and
wherein the second portion includes an electrical probe adapted to receive the electrical field transmitted by the electrical transmission line segments.

6. A rotary joint according to claim 5, wherein lengths of the optical transmission lines are substantially equal.

7. A rotary joint according to claim 5, wherein said at least one optical power splitter includes at least three cascaded optical power splitters.

8. A rotary joint according to claim 5 wherein the electrical transmission line is disposed circumferentially and axially symmetrically about the rotor.

9. A rotary joint according to claim 5, wherein the electrical transmission line segments are differentially driven by corresponding electrical drivers.

10. A rotary joint according to claim 5, wherein an electrical driver is configured to enable at least one of (i) impedance matching and (ii) signal frequency matching between the respectively corresponding opto-electrical converter and said one or two electrical transmission line segments.

11. A rotary joint according to claim 5, wherein the mutual positioning of the electrical probe and the electrical transmission line is such that the wireless electrical communication between said electrical probe and said electrical transmission line is established in a non-radial direction, as measured with respect to the rotor.

12. A rotary joint according to claim 5, wherein said electrical transmission line is adapted to enable the wireless electrical communication with the probe in a gigahertz frequency range.

13. A computed tomography (CT) scanner including a rotary joint according to claim 5.

* * * * *